(12) United States Patent
Chan et al.

(10) Patent No.: US 9,027,471 B2
(45) Date of Patent: May 12, 2015

(54) FOOD-DRYING DEVICE AND RELATED DRIVE MECHANISM

(75) Inventors: Kwan Kit Chan, Hung Hom (HK); Chung Ming Chan, Hung Hom (HK)

(73) Assignee: Golden Choice Products Ltd., Kowloon (HK)

( * ) Notice: Subject to any disclaimer, the term of this patent is extended or adjusted under 35 U.S.C. 154(b) by 434 days.

(21) Appl. No.: 13/448,790

(22) Filed: Apr. 17, 2012

(65) Prior Publication Data

US 2013/0180414 A1 Jul. 18, 2013

(30) Foreign Application Priority Data

Jan. 13, 2012 (HK) .................. 12100414.4

(51) Int. Cl.
| | | |
|---|---|---|
| A47J 43/04 | (2006.01) |
| F26B 17/24 | (2006.01) |
| A23N 12/08 | (2006.01) |
| B04B 1/00 | (2006.01) |
| F26B 5/08 | (2006.01) |
| A47J 43/044 | (2006.01) |
| F16H 19/04 | (2006.01) |
| A47J 43/24 | (2006.01) |

(52) U.S. Cl.
CPC ......... *A23N 12/086* (2013.01); *Y10T 74/18128* (2015.01); *B04B 1/00* (2013.01); *F26B 5/08* (2013.01); *A47J 43/044* (2013.01); *F16H 19/04* (2013.01); *F16H 19/043* (2013.01); *A47J 43/24* (2013.01)

(58) Field of Classification Search
CPC ............. F26B 5/08; B04B 1/00; A47J 43/044
USPC .......... 99/495; 34/58; 494/60, 84; 210/360.1, 210/380.1, 781, 784
See application file for complete search history.

(56) References Cited

U.S. PATENT DOCUMENTS

| | | | | |
|---|---|---|---|---|
| 5,562,025 | A * | 10/1996 | Bull et al. ...................... | 99/495 |
| 5,865,109 | A | 2/1999 | Bull | |
| 5,992,309 | A | 11/1999 | Mulhauser et al. | |
| 6,510,785 | B1 * | 1/2003 | Margolin ........................ | 99/495 |
| 7,621,213 | B2 | 11/2009 | Wong | |
| 7,975,605 | B2 * | 7/2011 | Wan et al. ...................... | 99/495 |
| 2007/0137504 | A1 * | 6/2007 | Wan et al. ...................... | 99/495 |
| 2010/0263555 | A1 * | 10/2010 | Mah et al. ...................... | 99/495 |

FOREIGN PATENT DOCUMENTS

CN 2059338 7/1990

* cited by examiner

*Primary Examiner* — Reginald L Alexander
(74) *Attorney, Agent, or Firm* — Wolf, Greenfield & Sacks, P.C.

(57) ABSTRACT

The current invention discloses a food-drying device that includes a container, a drying assembly having a plurality of bores, and a drive mechanism. The drying assembly is disposed in the container and is capable of being rotated relative to the container. The drive mechanism rotates the drying assembly relative to the container. The drive mechanism includes a reciprocating handle movable between a first position and a second position along a linear direction, and a conversion mechanism for converting reciprocating movement of the reciprocating handle to rotary motion of the drying assembly from force supplied by a user to actuate the reciprocating handle moving from the first position to the second position, and from force supplied by the user to actuate the reciprocating handle moving from the second position to the first position.

6 Claims, 23 Drawing Sheets

FOOD-DRYING DEVICE AND RELATED DRIVE MECHANISM

FIELD OF THE INVENTION

This invention relates to food-drying device with drive mechanism, and the related drive mechanism, particularly those for converting reciprocating movement of a user to rotation motion of the object to be driven.

BACKGROUND OF THE INVENTION

In many cases, it is desirable to dry washed food, for example to avoid making watery salad, and such food-drying devices or salad spinners are known. Typically, such device has a container, in which a drying assembly having a plurality of bores, for example a basket, is disposed. The drying assembly can be rotated relative to the container. A drive mechanism for rotating the drying assembly relative to the container is provided, while the drive mechanism is usually integrated with the cover of the container. The drive mechanism is typically actuated by a handle.

Salad spinners in U.S. Pat. No. 5,865,109 and U.S. Pat. No. 7,621,213 have a drive mechanism that includes a reciprocating handle movable along a path, and a conversion mechanism for converting reciprocating movement of the reciprocating handle to rotary motion of the drying assembly. However, the drive mechanism in these salad spinners only allow movement of the reciprocating handle in one direction to be converted to rotary motion of the drying assembly. That is, force applied by the user in another direction of the reciprocating movement of the reciprocating handle is wasted as such is not converted to rotary motion of the drying assembly.

Although the drive mechanism of the salad spinners of U.S. Pat. No. 5,992,309 is able to convert reciprocating movement of the handle to rotary motion of the drying assembly, in fact the user can apply force in one direction of the reciprocating movement. Movement of the handle in another direction of the reciprocating movement only occurs when force is no longer applied. Therefore, the user can only apply force in one direction of the reciprocating movement of the reciprocating handle for conversion to rotary motion of the drying assembly Therefore, there is a need to devise cleverer drive mechanism that can more effectively convert force applied by a user during reciprocating movement of the handle to rotary motion of the drying assembly.

Objects of the Invention

Therefore, it is an object of this invention to resolve at least one or more of the problems as set forth in the prior art. Particularly, it is an object of the current invention to provide food-drying devices that can more effectively covert force applied by a user during reciprocating movement of the handle to rotary motion of the drying assembly. As a minimum, it is an object of this invention to provide the public with a useful choice.

SUMMARY OF THE INVENTION

Accordingly, this invention provides a food-drying device including a container; a drying assembly having a plurality of bores, said drying assembly disposed in the container and capable of being rotated relative to the container; and a drive mechanism for rotating the drying assembly relative to the container. The drive mechanism includes a reciprocating handle movable between a first position and a second position along a path, and a conversion mechanism for converting reciprocating movement of the reciprocating handle to rotary motion of the drying assembly from force supplied by a user to actuate the reciprocating handle moving from the first position to the second position, and from force supplied by the user to actuate the reciprocating handle moving from the second position to the first position. The conversion mechanism includes a slot assembly having ratchet teeth along two edges defining a slot, said slot assembly being coupled to the reciprocating handle, and said slot having a first end corresponding to the first position, and a second end corresponding to the second position.

Preferably, the conversion mechanism includes an output gear being coupled to the drying assembly; a drive gear meshing with the ratchet teeth such that said slot assembly rotates the drive gear between the first end and the second end; and a clutch gear meshing with the drive gear, said clutch gear engaging the output gear when the drive gear is between the first end and the second end, and disengaging the output gear when the drive gear is at the first end or the second end. The ratchet teeth and the drive gear are arranged such that when the reciprocating handle changes direction of movement when the drive gear reaches the first end or the second end, the ratchet teeth can continue to rotate the drive gear, preferably in the same direction.

More preferably, at least a portion of the ratchet teeth along the two edges is movable when the drive gear reaches the first end or the second end and is biased to engage the drive gear. Alternatively, the drive gear have flexible gears that mesh with the ratchet teeth, said flexible gears are movable when the drive gear reaches the first end or the second end and are biased to engage the ratchet teeth.

Even more preferably, the at least a portion of the ratchet teeth along the two edges is positioned at diagonally opposing ends of the two edges, and the ratchet teeth at other diagonally opposing ends of the two edges have reduced pitch. Alternatively, entire portion of the ratchet teeth along the two edges is movable and is biased to engage the drive gear as two movable racks, said movable racks having respective pivotal points being positioned diagonally opposing each other along the slot, and the ratchet teeth at other diagonally opposing ends of the two edges have reduced pitch.

Optionally, the drying assembly has an open end opposing a closed end, and the closed end has at least one additional rim to increase weight of the closed end.

It is another aspect of this invention to provide a drive mechanism for driving a device, that includes a reciprocating handle movable between a first position and a second position along a path, and a conversion mechanism for converting reciprocating movement of the reciprocating handle to rotary motion from force supplied by a user to actuate the reciprocating handle moving from the first position to the second position, and from force supplied by the user to actuate the reciprocating handle moving from the second position to the first position. The conversion mechanism includes
  an output gear;
  a slot assembly having ratchet teeth along two edges defining a slot, said slot assembly being coupled to the reciprocating handle, and said slot having a first end corresponding to the first position, and a second end corresponding to the second position;
  a drive gear meshing with the ratchet teeth such that said slot assembly rotates the drive gear between the first end and the second end; and
  a clutch gear meshing with the drive gear, said clutch gear engaging the output gear when the drive gear is between the first end and the second end, and disengaging the output gear when the drive gear is at the first end or the second end wherein at least a portion of the ratchet teeth along the two edges is movable when the drive gear reaches the first end or the second end and is biased to engage the drive gear.

It is another aspect of this invention to provide a drive mechanism for driving a device that includes a reciprocating handle movable between a first position and a second position along a path, and a conversion mechanism for converting reciprocating movement of the reciprocating handle to rotary motion from force supplied by a user to actuate the reciprocating handle moving from the first position to the second position, and from force supplied by the user to actuate the reciprocating handle moving from the second position to the first position. The conversion mechanism includes an output gear;

a slot assembly having ratchet teeth along two edges defining a slot, said slot assembly being coupled to the reciprocating handle, and said slot having a first end corresponding to the first position, and a second end corresponding to the second position;

a drive gear meshing with the ratchet teeth such that said slot assembly rotates the drive gear between the first end and the second end;

a clutch gear meshing with the drive gear, said clutch gear engaging the output gear when the drive gear is between the first end and the second end, and disengaging the output gear when the drive gear is at the first end or the second end wherein the drive gear have flexible gears that mesh with the ratchet teeth, said flexible gears are movable when the drive gear reaches the first end or the second end and are biased to engage the ratchet teeth.

BRIEF DESCRIPTION OF THE DRAWINGS

Preferred embodiments of the present invention will now be explained by way of example and with reference to the accompanying drawings in which.

DETAILED DESCRIPTION OF THE PREFERRED EMBODIMENTS

Figure 1:
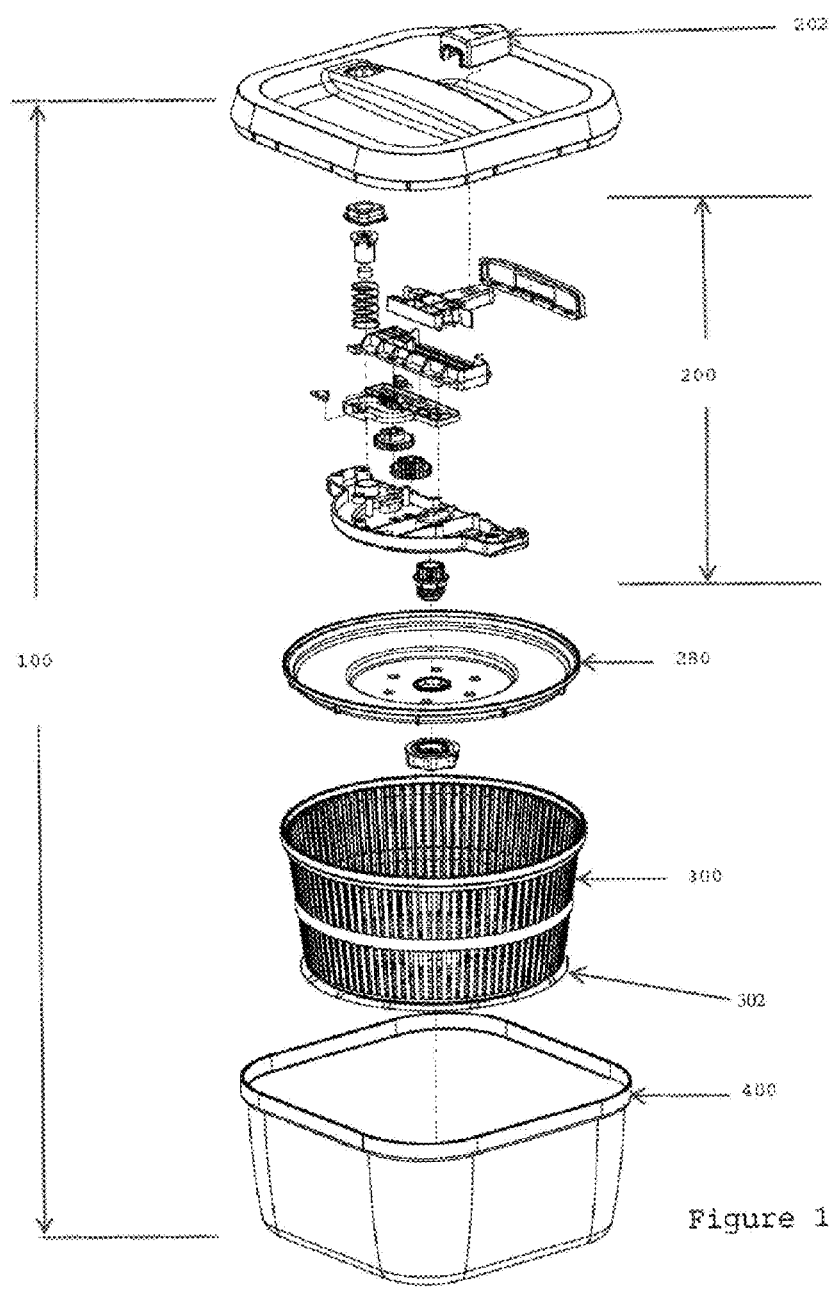
FIG. 1 shows an exploded view of an exemplary food-drying device of this invention.

This invention is now described by way of examples with reference to the figures in the following paragraphs. Objects, features, and aspects of the present invention are disclosed in or are apparent from the following description. It is to be understood by one of ordinary skilled in the art that the present discussion is a description of exemplary embodiments only, and is not intended as limiting the broader aspects of the present invention, which broader aspects are embodied in the exemplary constructions. List 1 is a list showing the parts and respective reference numerals in the figures.

| List 1 | |
|---|---|
| Reference numeral | Part name |
| 100 | Food-drying device |
| 200 | Drive mechanism |
| 201 | Top cover |
| 202 | Reciprocating handle |
| 204 | Fixed frame |
| 206 | Slot assembly |
| 207 | Slot |
| 208 | Ratchet teeth |
| 208a | Ratchet teeth with reduced pitch |
| 210 | Movable pitch module |
| 211 | Elastic spring plate |
| 212 | Pivot point |

-continued

List 1

| Reference numeral | Part name |
|---|---|
| 220 | Drive gear |
| 230 | Clutch gear |
| 232 | Clutch gear swing slot |
| 240 | Output gear |
| 270 | Drive mechanism bottom cover |
| 280 | Drying assembly connecting plate |
| 300 | Drying assembly |
| 400 | Container |
| 506 | Slot assembly |
| 508 | Movable ratchet teeth rack |
| 508a | Ratchet teeth with reduced pitch |
| 511 | Coil spring |
| 512 | Pivot point |
| 606 | Slot assembly |
| 608 | Ratchet teeth |
| 620 | Drive gear |
| 622 | Drive gear flexible gear |
| 624 | Drive gear elastic spring plate |
| 626 | Flexible gear swing slot |
| 628 | Flexible gear pivot point |

The exploded view of a first exemplary food-drying device 100 of the current invention is shown in FIG. 1. The food-drying device 100 has a drive mechanism 200 for rotating the drying assembly 300, which is in the form of a basket having a plurality of bores in this particular embodiment. The drying assembly 300 is contained in a container 400. The drive mechanism 200, the drying assembly 300, and the container 400 can be in any desire shape, for example the general quadrate shape as shown in FIG. 1, or general cylindrical shape. Naturally, the drive mechanism 200, the drying assembly 300, and the container 400 should match each other or at least be able to accommodate each other.

Figure 2:
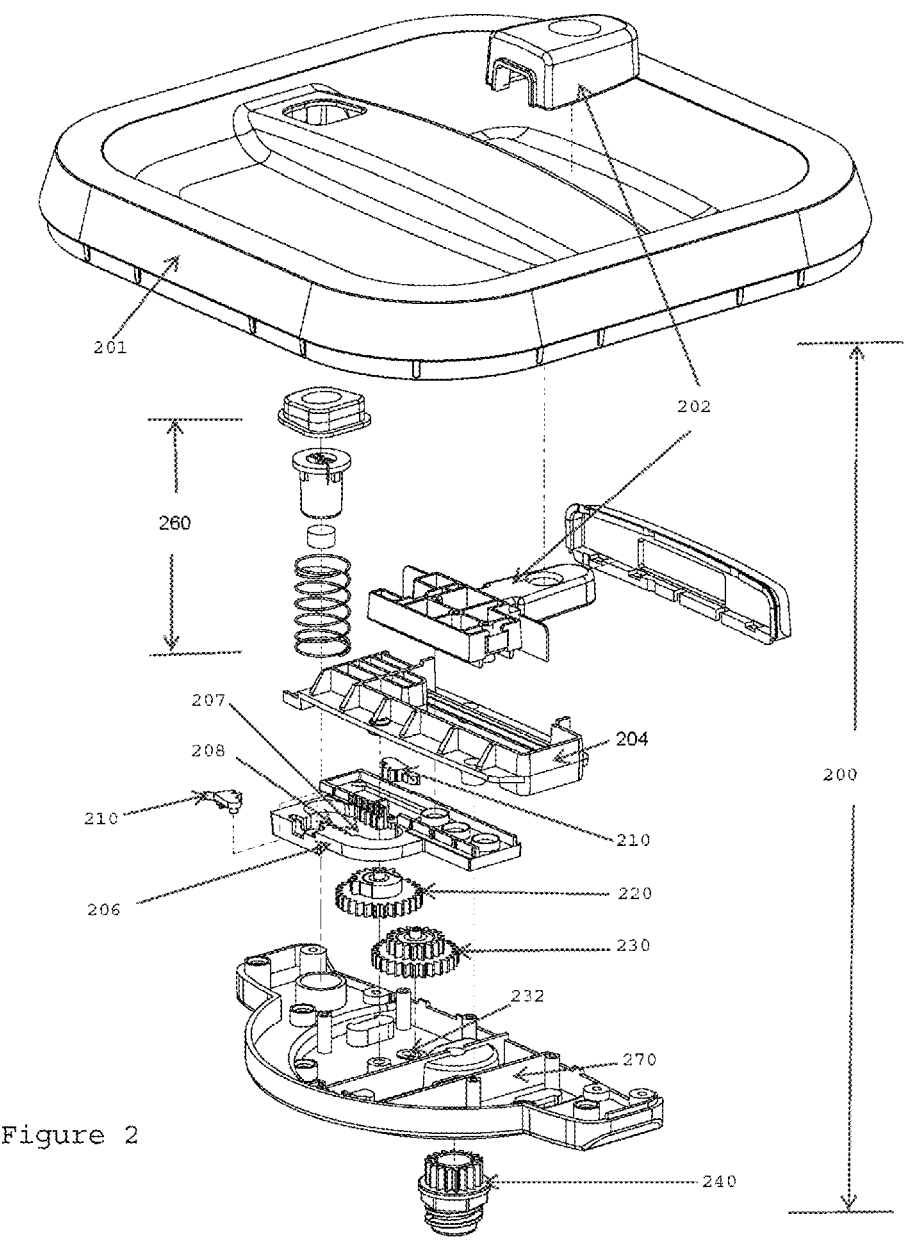
FIG. 2 shows the enlarged view of the drive mechanism of the food-drying device of FIG. 1.

The reciprocating handle 202 in the exemplary food-drying device 100 in FIGS. 1 and 2 is able move between a first position and a second position along a path, in this particular example being a linear path. However, this path can be curved as in U.S. Pat. No. 5,865,109 and U.S. Pat. No. 7,621,213 if desired. The design of the reciprocating handle 202 is not important as long as it can be moved linear in a reciprocating manner. The first position and the second position correspond to the two end points of the aperture of the top cover 201. The reciprocating handle 202 is coupled to a slot assembly 206, which is actuated by the reciprocating handle 202. The slot assembly 206 can be actuated to move in the same direction when a user actuates the reciprocating handle 202, or in the opposite direction if desired, subject to how the slot assembly 206 is coupled to the reciprocating handle 202. An optional fixed frame 204 is provided in the exemplary food-drying device 100 to limit the slot assembly 206 to move along the path.

Figure 3:
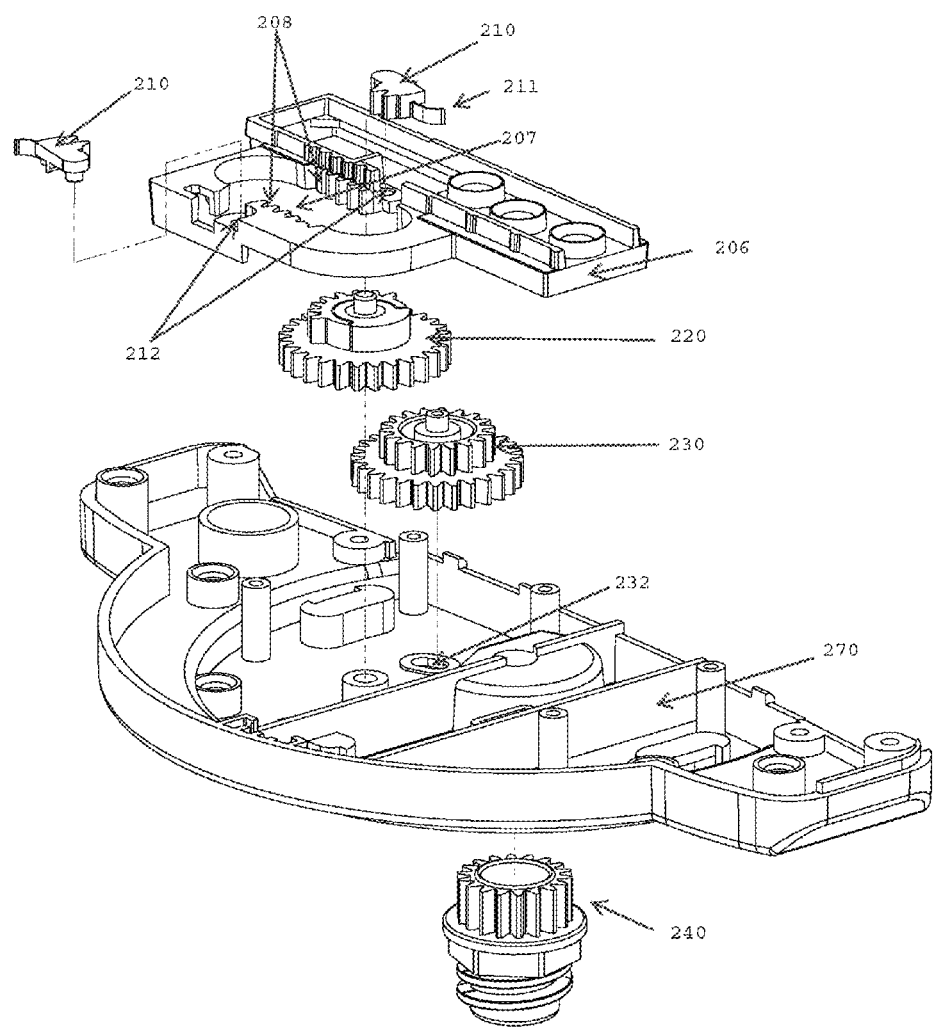
FIG. 3 shows yet another exploded view of the drive mechanism of the food-drying device of FIG. 1 without showing the reciprocating handle.
Figure 4:
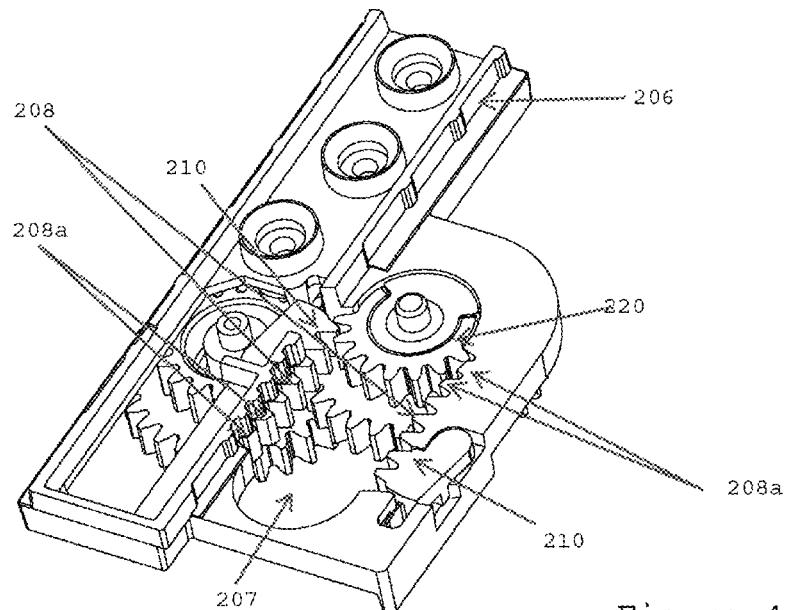
FIG. 4 shows the arrangement of the slot assembly and the drive gear of the drive mechanism of the food-drying device of FIG. 1.
Figure 5:
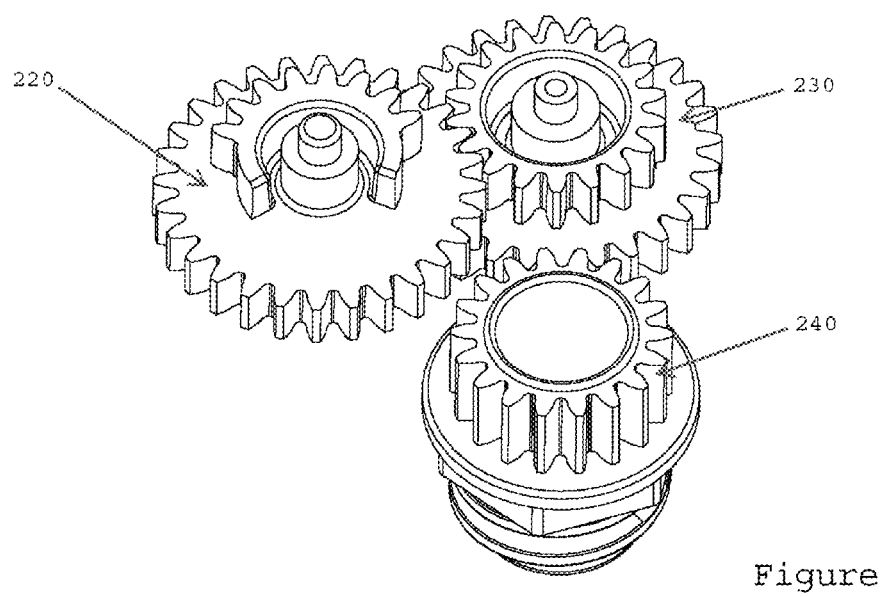
FIG. 5 shows the connection of the drive gear, clutch gear, and output gear of the drive mechanism of the food-drying device of this invention.
Figure 6A:
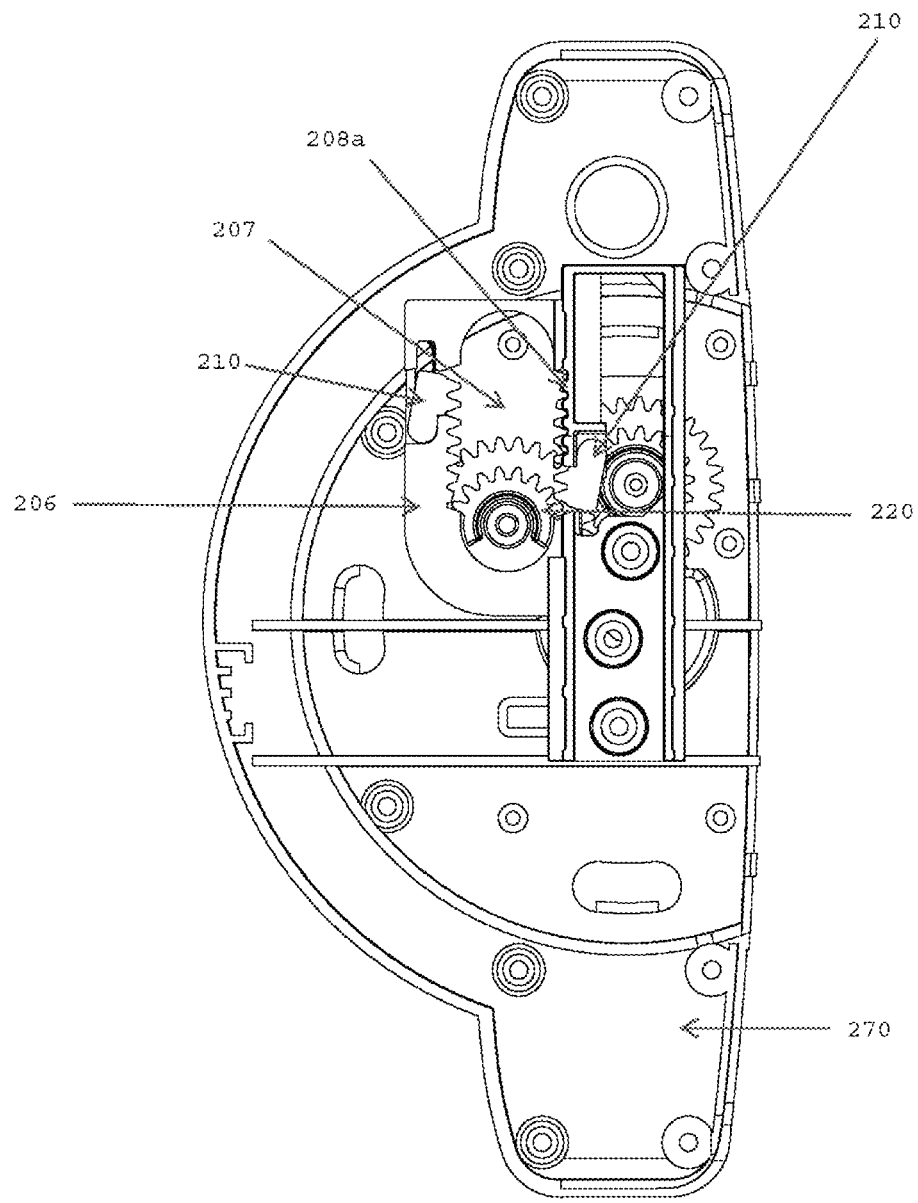
FIGS. 6a and 6b show the relationship between the slot assembly, drive gear, clutch gear, and output gear of the drive mechanism of the food-drying device of FIG. 1 when the slot assembly is at one end point.
Figure 6B:
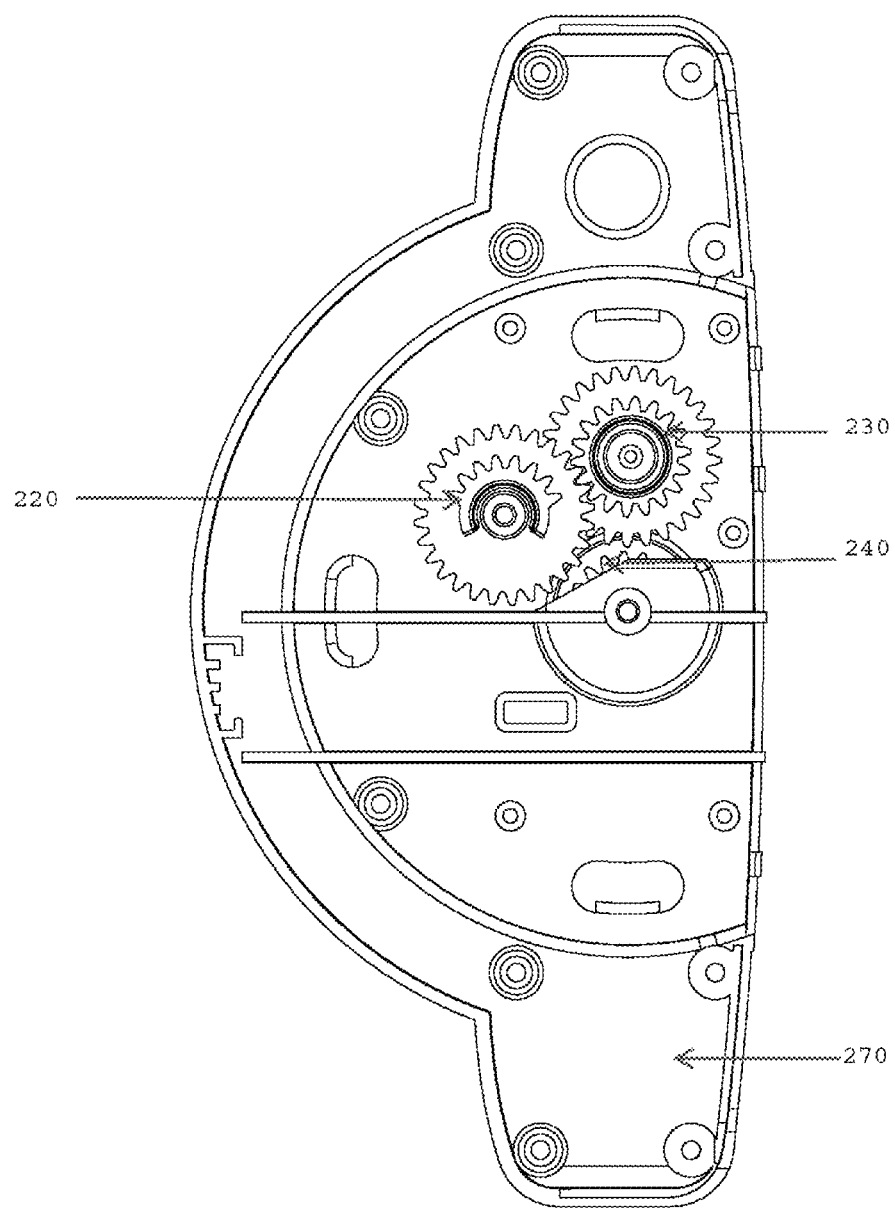
Figure 7A:
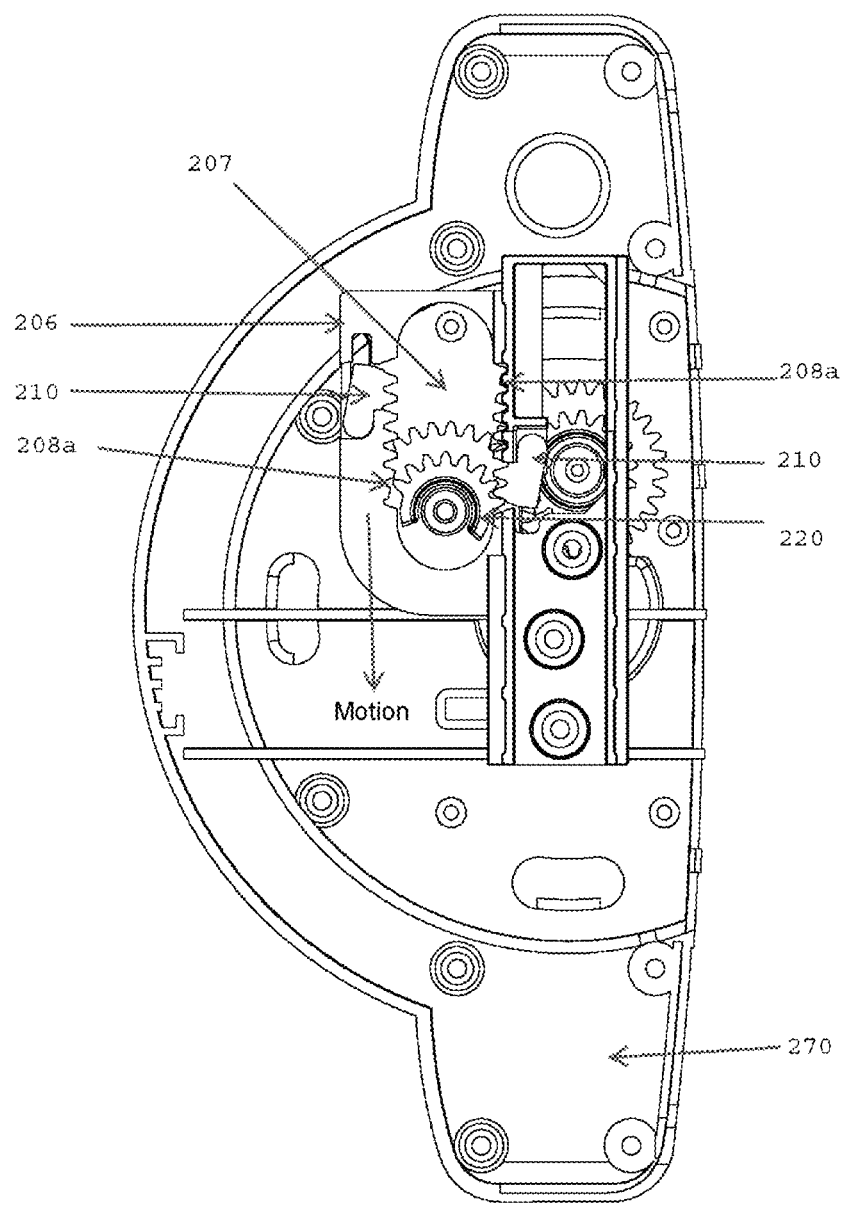
FIGS. 7a and 7b show the relationship between the slot assembly, drive gear, clutch gear, and output gear of the drive mechanism of the food-drying device of FIG. 1 when the slot assembly is moving out of the end point in FIG. 6.
Figure 7B:
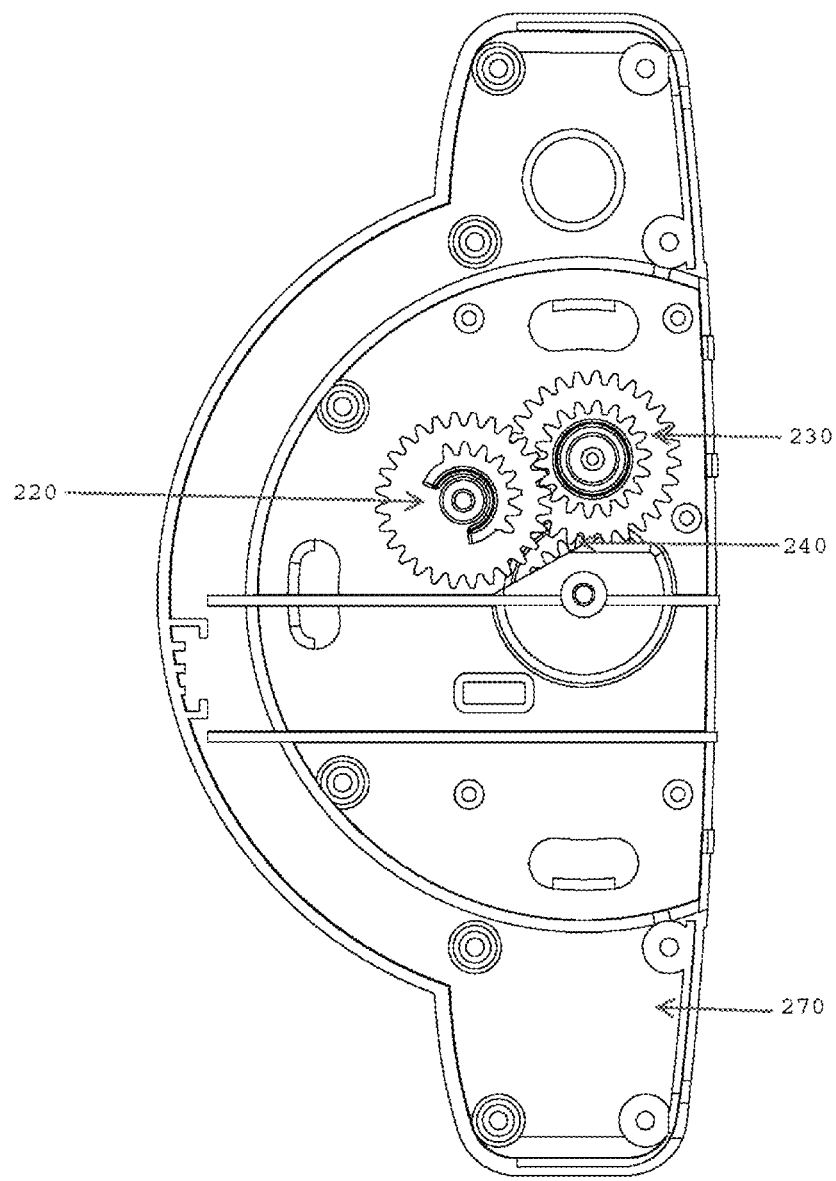

As shown in FIGS. 2 and 3, the slot assembly 206 has ratchet teeth 208 along two edges that define a slot 207. The slot 207 has a first end that corresponds to the first position, and a second end that corresponds to the second position of the reciprocating handle 202. As shown in FIG. 4, a drive gear 220 meshes with the ratchet teeth 208 in the slot 207 such that when the slot assembly is actuated as the reciprocating handle 202 is actuated, the drive gear 220 is rotated. As shown in FIG. 5, a clutch gear 230 meshes with the drive gear 220, the clutch gear 230 engaging an output gear 240 when the drive gear 220 is between the first end and the second end, and disengaging the output gear 240 when the drive gear 220 is at the first end or the second end by means of the clutch gear swing slot 232 (shown in FIG. 3), as in other clutch mechanisms for converting reciprocating motion to rotatory motion. The output gear 240 is coupled to the drying assembly 300 through the drying assembly connecting plate 280 for rotating the drying assembly 300. For the convenience of assembly, all components can be assembled on an optional drive mechanism bottom cover 270.

The ratchet teeth 208 and the drive gear 220 are arranged such that when the reciprocating handle 202 changes direction of movement when the drive gear 220 reaches the first end or the second end, the ratchet teeth 208 can continue to rotate the drive gear 220. Otherwise, the drive gear 220 will be jammed when reaching the first end or the second end during the reciprocating movement. The detail of various arrangements to achieve this will be discussed below.

FIG. 4 shows one of such arrangements, in which at least a portion of the ratchet teeth 208 along the two edges is movable when the drive gear 220 reaches the first end or the second end, and is biased to engage the drive gear 220. In this specific embodiment, the movable portion of the ratchet teeth is in the form of a movable pitch module 210, which is biased to engage the drive gear 220 by respective elastic spring plates 211 (as shown in FIG. 3), which can be replaced by any suitable biasing means like spring. More specifically, the movable portion of the ratchet teeth 208 along the two edges is positioned at diagonally opposing ends of the two edges, and the ratchet teeth at other diagonally opposing ends of the two edges have reduced pitch 208a. It was found that if only ratchet teeth with reduced pitch are provided at the first end or the second end, then drive gear 220 may not be able to be driven by the ratchet teeth smoothly after reaching the first end or the second end during the linear reciprocating movement.

Figure 8:
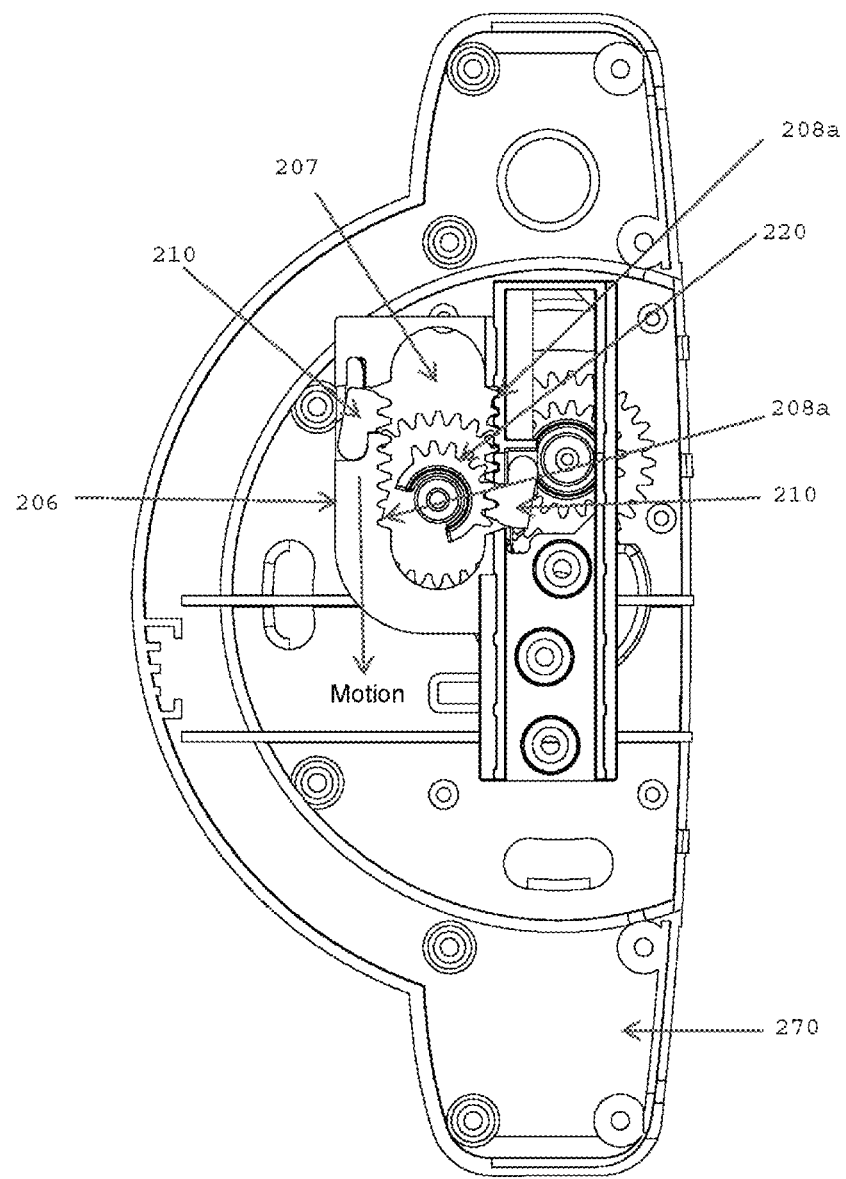
FIG. 8 shows the relationship between the slot assembly, drive gear, clutch gear, and output gear of the drive mechanism of the food-drying device of FIG. 1 when the slot assembly is approaching the other end point in FIG. 6.
Figure 9:
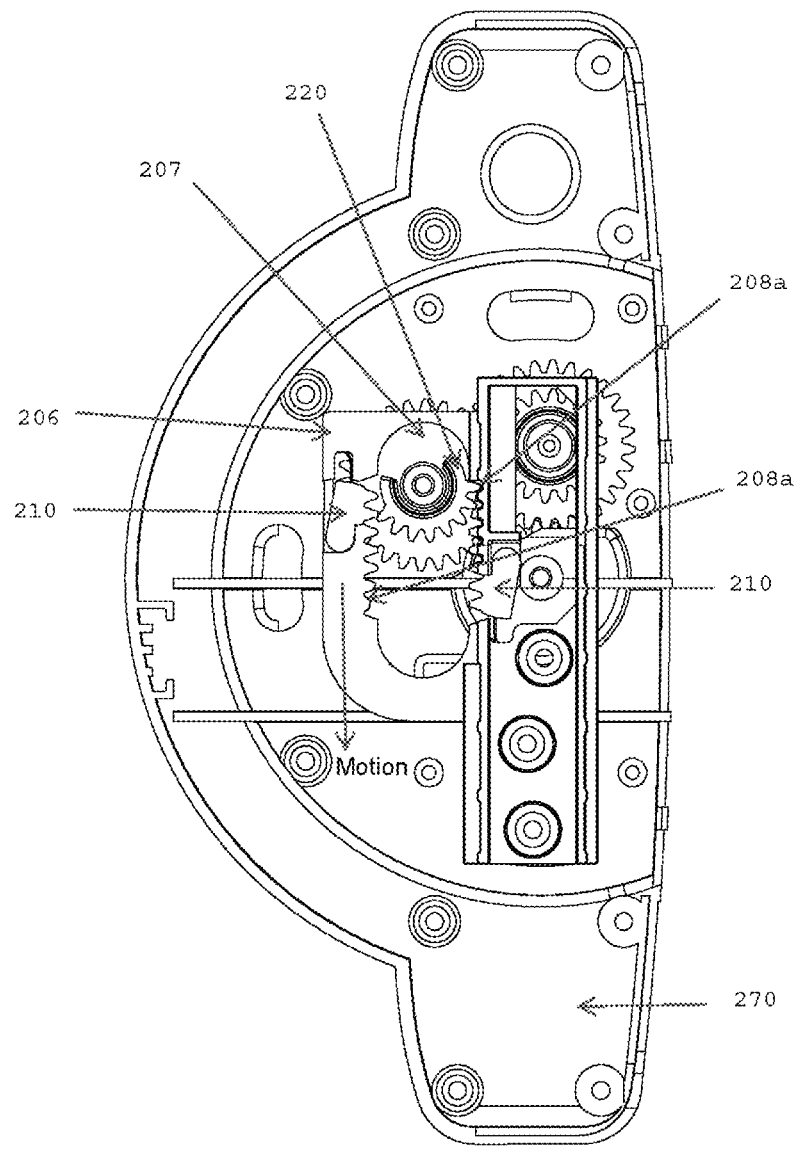
FIG. 9 shows the relationship between the slot assembly, drive gear, clutch gear, and output gear of the drive mechanism of the food-drying device of FIG. 1 when the slot assembly is about to reach the other end point in FIG. 6.
Figure 10:
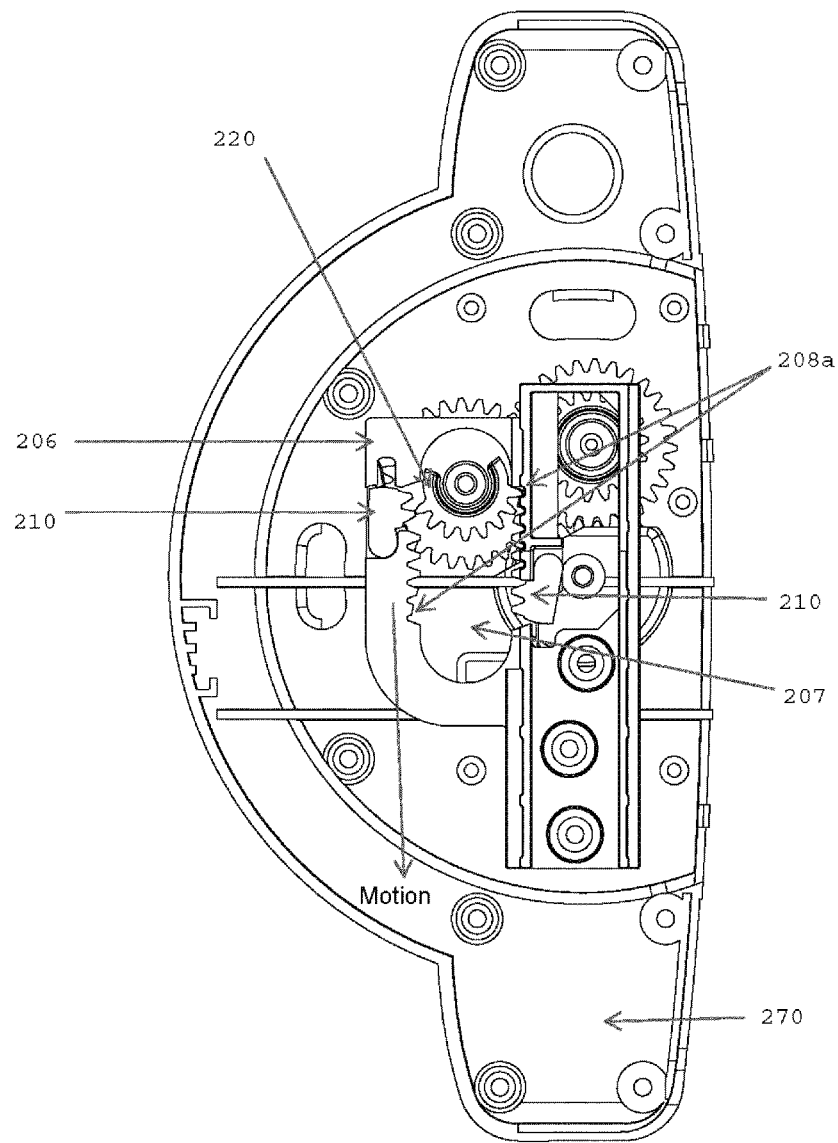
FIG. 10 shows the relationship between the slot assembly, drive gear, clutch gear, and output gear of the drive mechanism of the food-drying device of FIG. 1 when the slot assembly enters the other end point in FIG. 6.
Figure 11A:
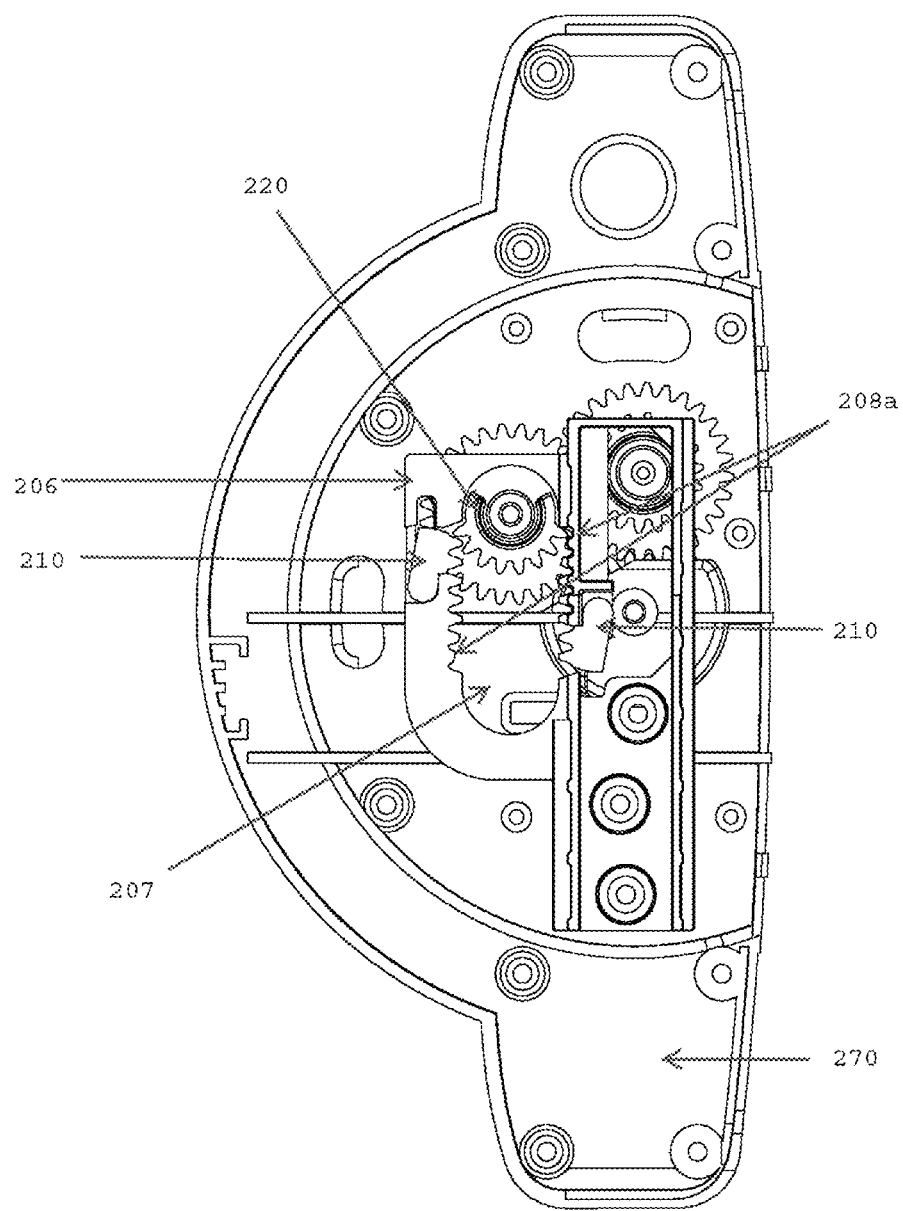
FIGS. 11a and 11b show the relationship between the slot assembly, drive gear, clutch gear, and output gear of the drive mechanism of the food-drying device of FIG. 1 when the slot assembly reaches the other end point in FIG. 6.
Figure 11B:
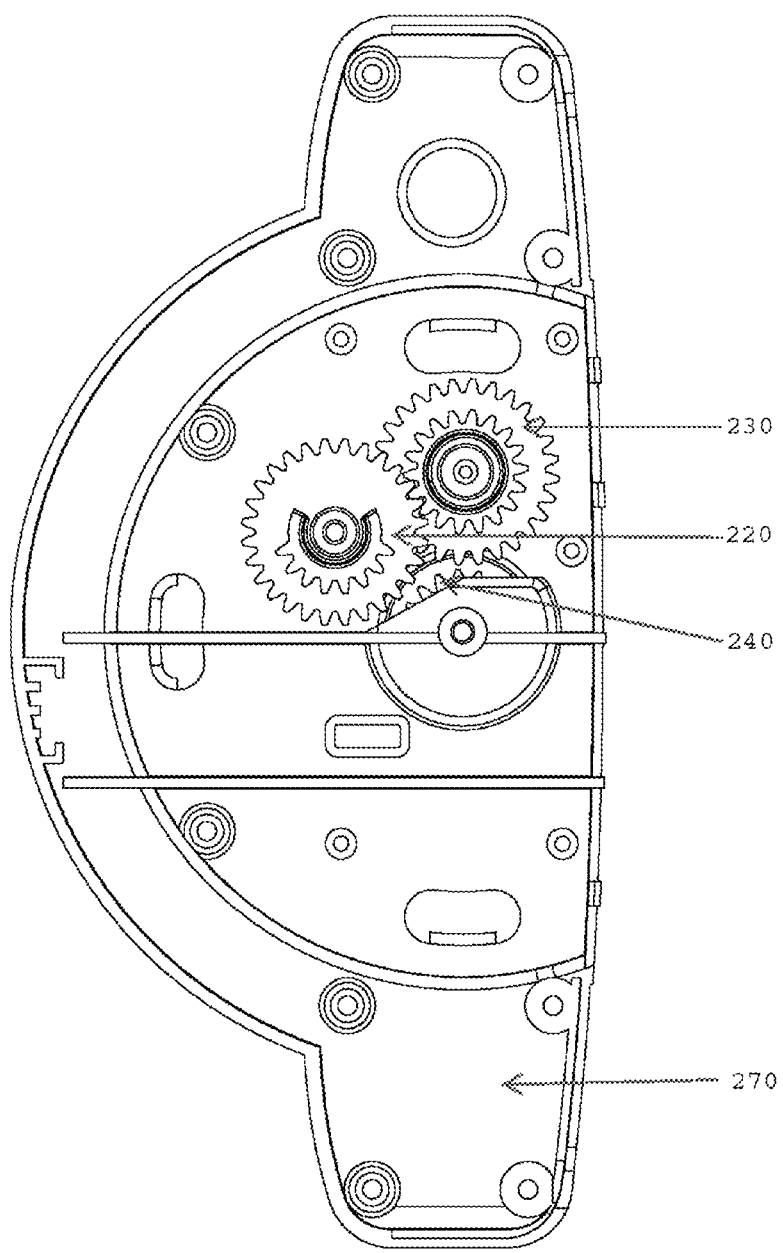
Figure 12:
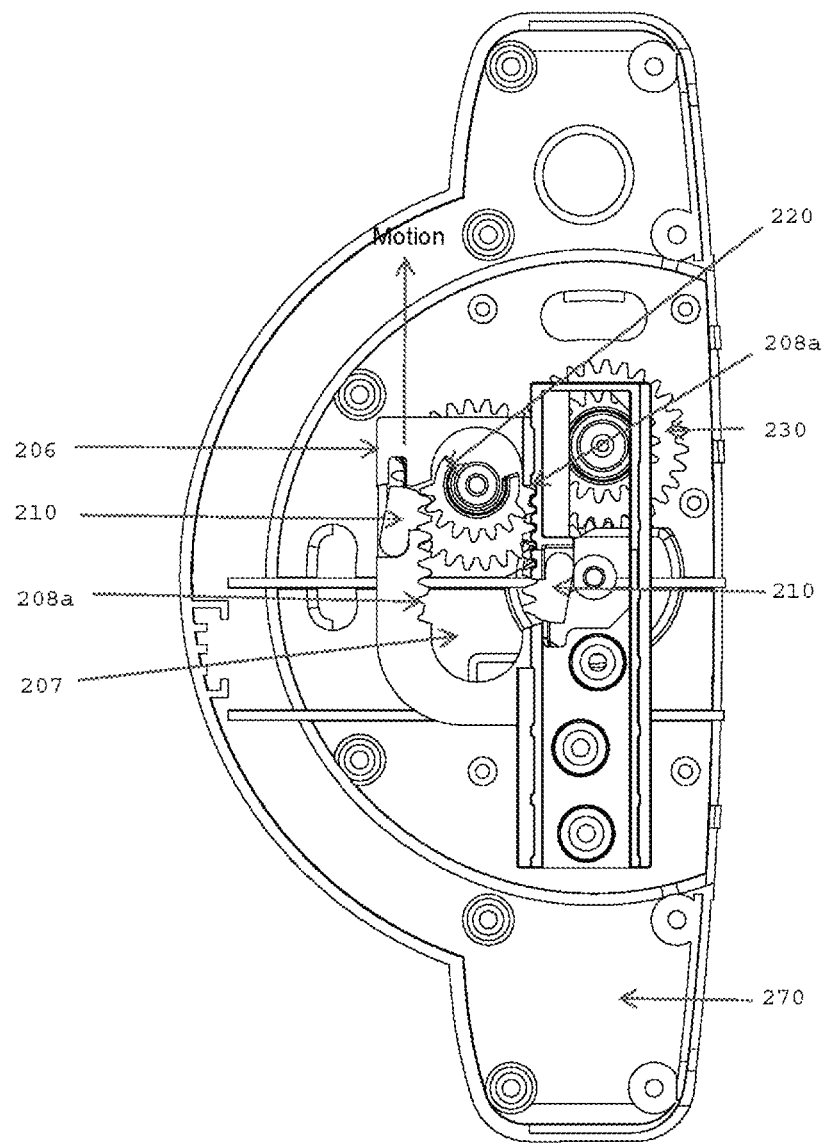
FIG. 12 shows the relationship between the slot assembly, drive gear, clutch gear, and output gear of the drive mechanism of the food-drying device of FIG. 1 when the slot assembly is moving out of the other end point in FIG. 6.

FIGS. 6 to 12 show how the arrangement in FIG. 4 works, in which the relationship between the slot assembly 206, drive gear 220, clutch gear 230, and output gear 240 of the drive mechanism 200 of the food-drying device 100 is shown. In FIGS. 6a and 6b, the slot assembly 206 is at an upper end point, which can be viewed as the initial position in the sequence in FIGS. 6 to 12. As shown in FIG. 6b, the clutch gear 230 and output gear 240 are disengaged. In FIGS. 7a and 7b, when the reciprocating handle 201 is actuated by a user, the slot assembly 206 is caused to be moved out of the end point in FIG. 6 in a downward direction, and the drive gear 220 is rotated clockwise accordingly. This causes the clutch gear 230 to move about the clutch gear swing slot 232 in a clockwise direction to engage the output gear 240, such that when the drive gear 220 is rotated, the output gear 240 is also rotated through the clutch gear 230. In FIG. 8, the slot assembly 206 is moved further downward to approach the lower end point, and the slot assembly 206 is about to reach the lower end point in FIG. 9. In FIG. 10, the slot assembly 206 enters the lower end point in FIG. 6, in which the movable pitch module 210 "concedes" or is moved when the drive gear 220 presses against this movable pitch module 210. This movable pitch module 210 is arranged to pivot such that it only concedes when the drive gear 220 approaches the movable pitch module 210 from a forward direction when the drive gear 220 approaches the first or second end of the slot 207. On the other hand, when the drive gear 220 approaches the movable pitch module 210 from a backward direction such that when the drive gear 220 is leaving the first or second end of the slot 207, this movable pitch module 210 remains stationary. More specifically, the movable pitch module 210 pivots about a pivot point 212 (as shown in FIG. 3) that is distant from the first or second end of the slot 207 and in proximity to the slot 207. In FIGS. 11a and 11b, the slot assembly 206 reaches the lower end point, in which the movable pitch module 210 "retracts"

or returns to its normal position as the drive gear 220 approaches the end of the slot 207. As shown in FIG. 11b, the clutch gear 230 and output gear 240 are disengaged as the clutch gear 230 is moved in an anti-clockwise direction by the output gear 240 as the drive gear 220 does not drive at this end point. In FIG. 12, the slot assembly 206 is moving out of the lower end point by changing the direction of the linear motion. The cycle in FIGS. 6 to 12 then repeats in a reversed direction.

The drive gear 220 does not have full set of teeth to mesh with the slot assembly 206, but only half set of teeth. This allows the teeth of the drive gear 220 to engage with one of the racks in the slot 207 except at the first end and the second end.

It will be noted in FIGS. 6 to 12 that the movable pitch module 210 is biased to engage the drive gear 220 at all times.

Figure 13:
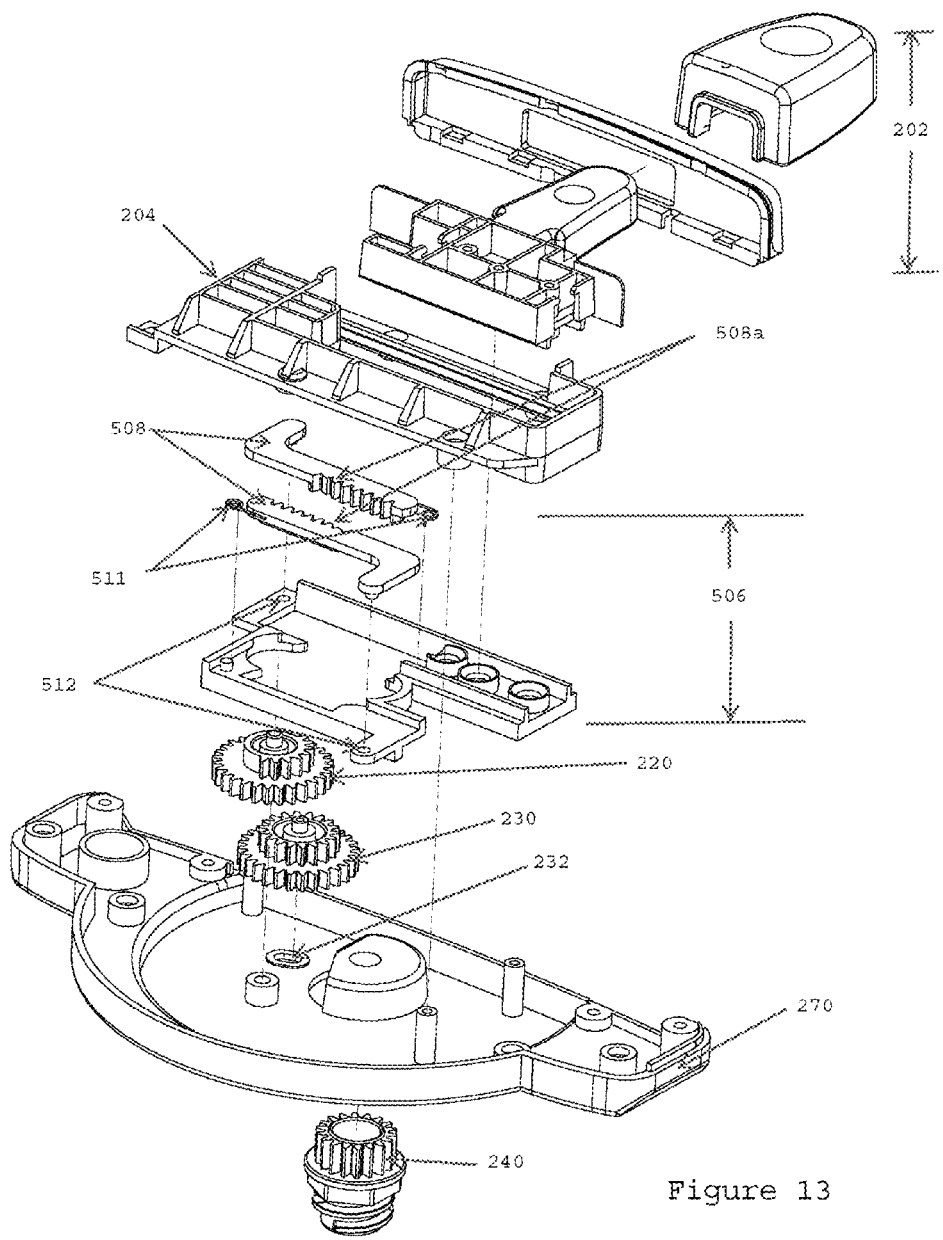
FIG. 13 shows the exploded view of the drive mechanism of another embodiment of this invention.

FIG. 13 shows another arrangement alternative to that shown in FIGS. 4 to 12. The components in FIG. 13 that are the same as those in FIGS. 4 to 12 are indicated by the same reference numbers. In this embodiment, entire portion of the ratchet teeth along the two edges of the slot assembly 506 is movable and is biased to engage the drive gear as two movable racks 508. The movable racks 508 having respective pivotal points 512 being positioned diagonally opposing each other along the slot 207, and the ratchet teeth at other diagonally opposing ends of the two edges have reduced pitch 508a. In the particular example in FIG. 13, the movable racks 508 are biased by coil springs 511 positioned at the other end of the pivot point 512. This alternative embodiment works in a manner similar to that shown in FIGS. 4 to 12.

Figure 14:
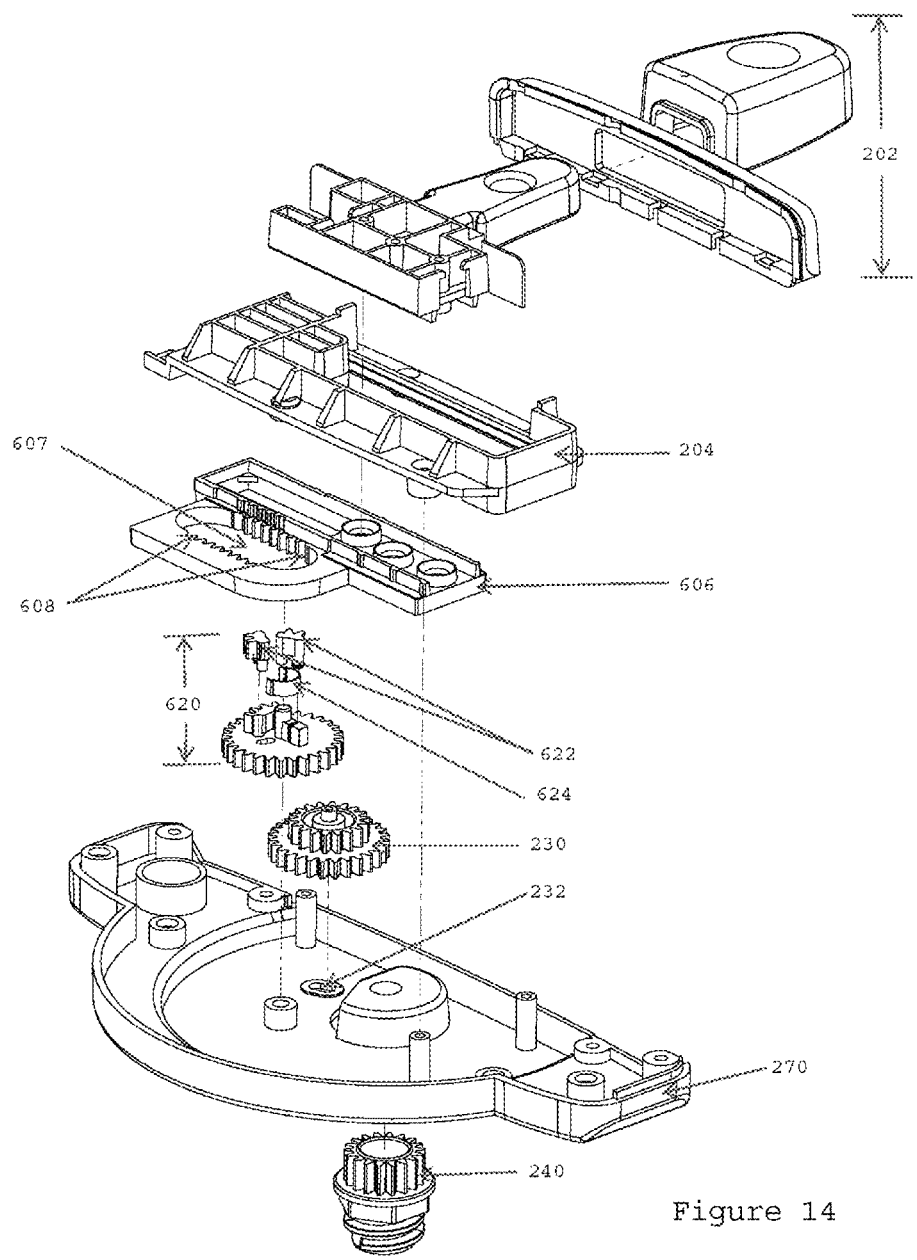
FIG. 14 shows the exploded view of the drive mechanism of yet another embodiment of this invention.
Figure 15:
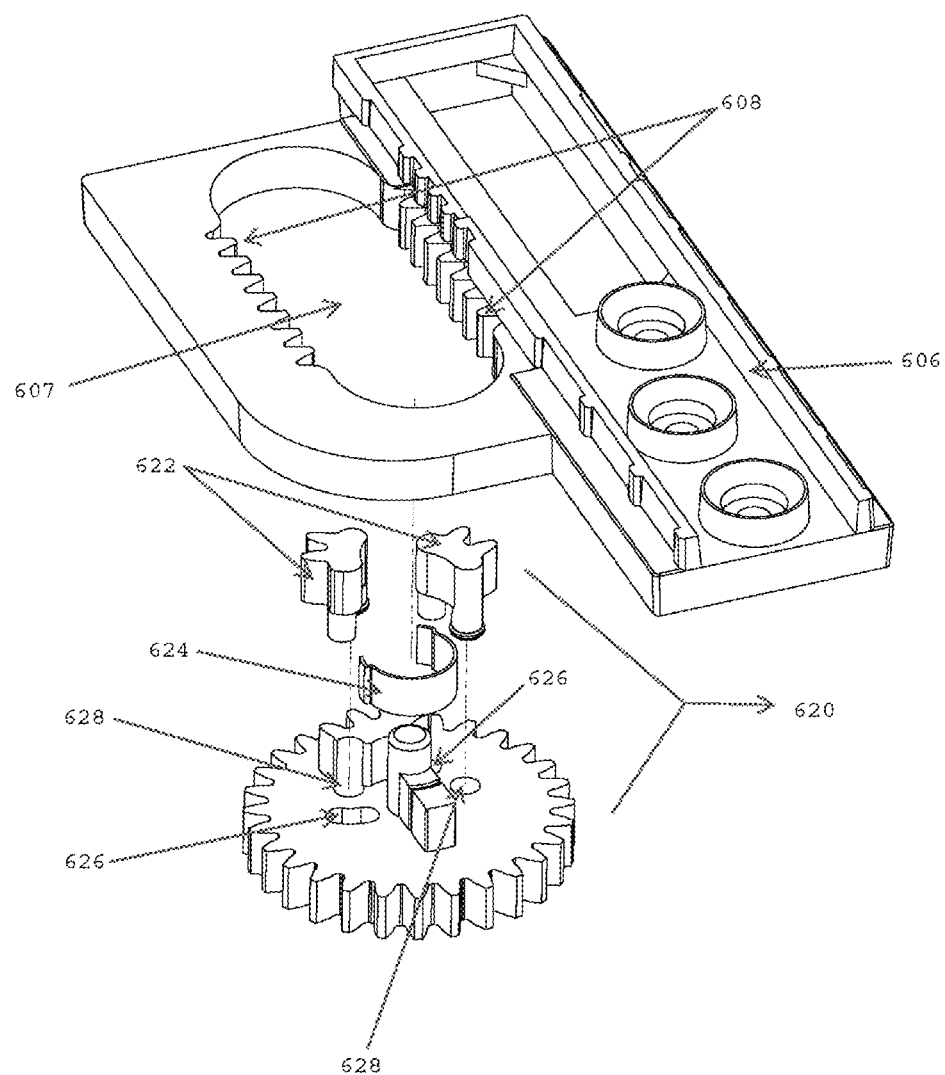
FIG. 15 shows yet another exploded view of the drive mechanism of FIG. 14 only showing the slot assembly and the drive gear.

FIGS. 14 and 15 show yet another arrangement alternative to those shown in FIGS. 4 to 13. The components in FIGS. 14 and 15 that are the same as those in FIGS. 4 to 13 are indicated by the same reference numbers. In this embodiment, the ratchet teeth 608 along the two edges of the slot 607 of the slot assembly 606 are not movable, and have no ratchet teeth with reduced pitch. Instead, the drive gear 620 has flexible gears, in this example being two sets of flexible gears 622 that mesh with the ratchet teeth 608. The two sets of flexible gears 622 are movable when the drive gear 620 reaches the first end or the second end, and are biased to engage the ratchet teeth 608 by drive gear elastic spring plate 624. The flexible gears 622 pivot about flexible gear pivot points 628 and within the flexible gear swing slots 626. The flexible gear pivot point 628 and the flexible gear swing slot 626 of each set of one set of flexible gears 622 are positioned diagonally opposing the other respective flexible gear pivot point 628 and the flexible gear swing slot 626 of the other set of flexible gears 622.

Figure 16A:
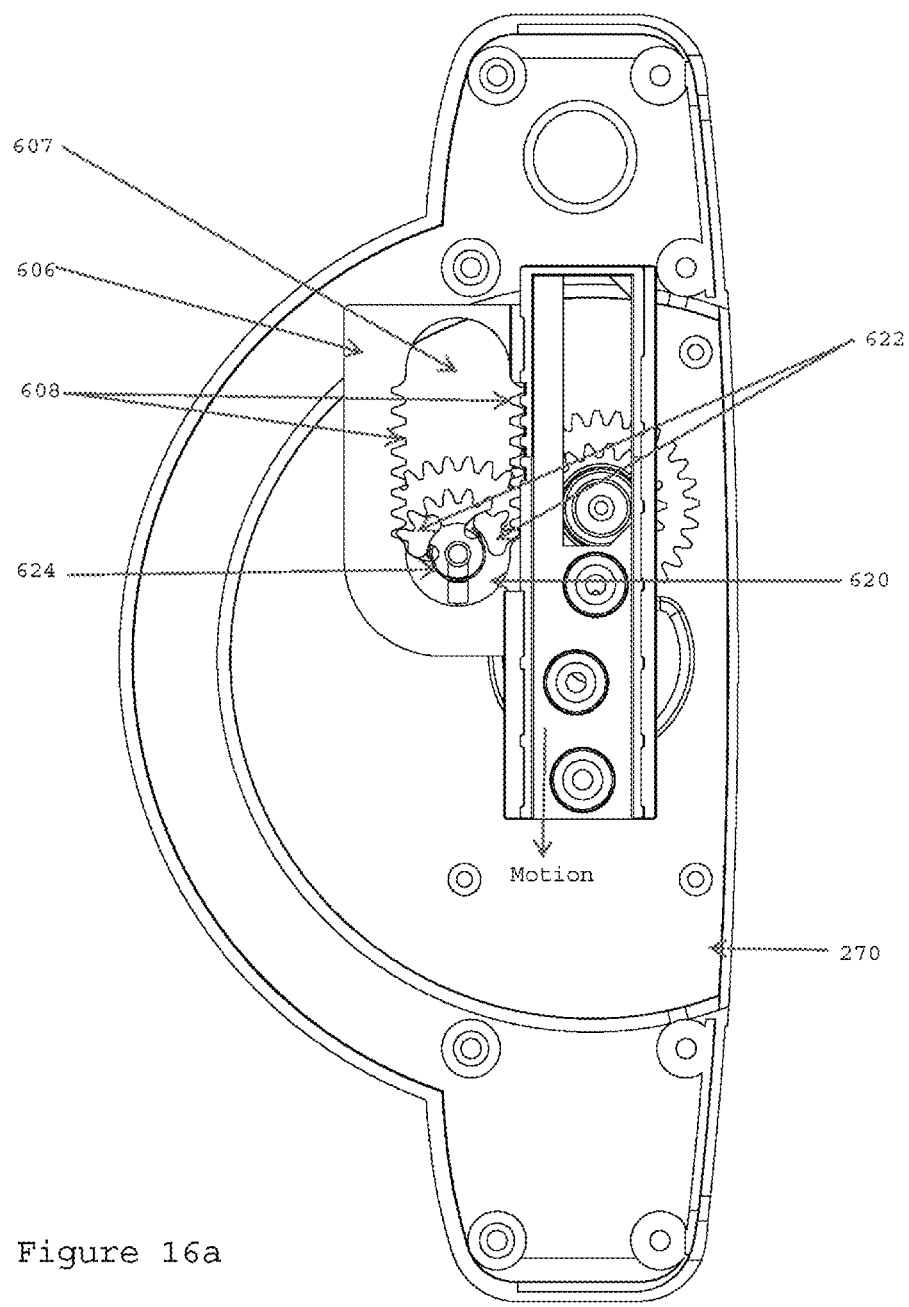
FIGS. 16a and 16b show the relationship between the slot assembly, drive gear, clutch gear, and output gear of the drive mechanism of FIGS. 14 and 15 when the slot assembly is at one end point.
Figure 16B:
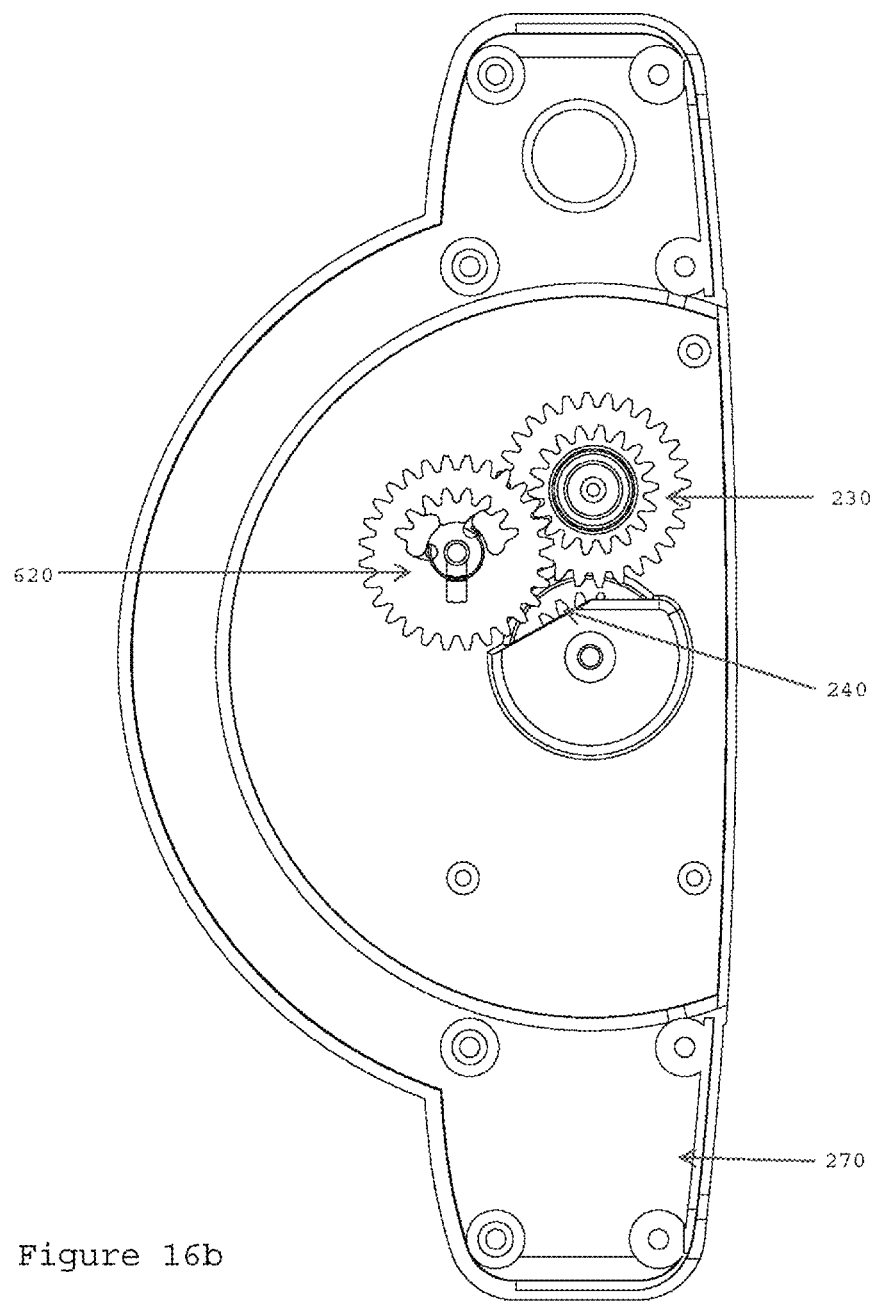
Figure 17A:
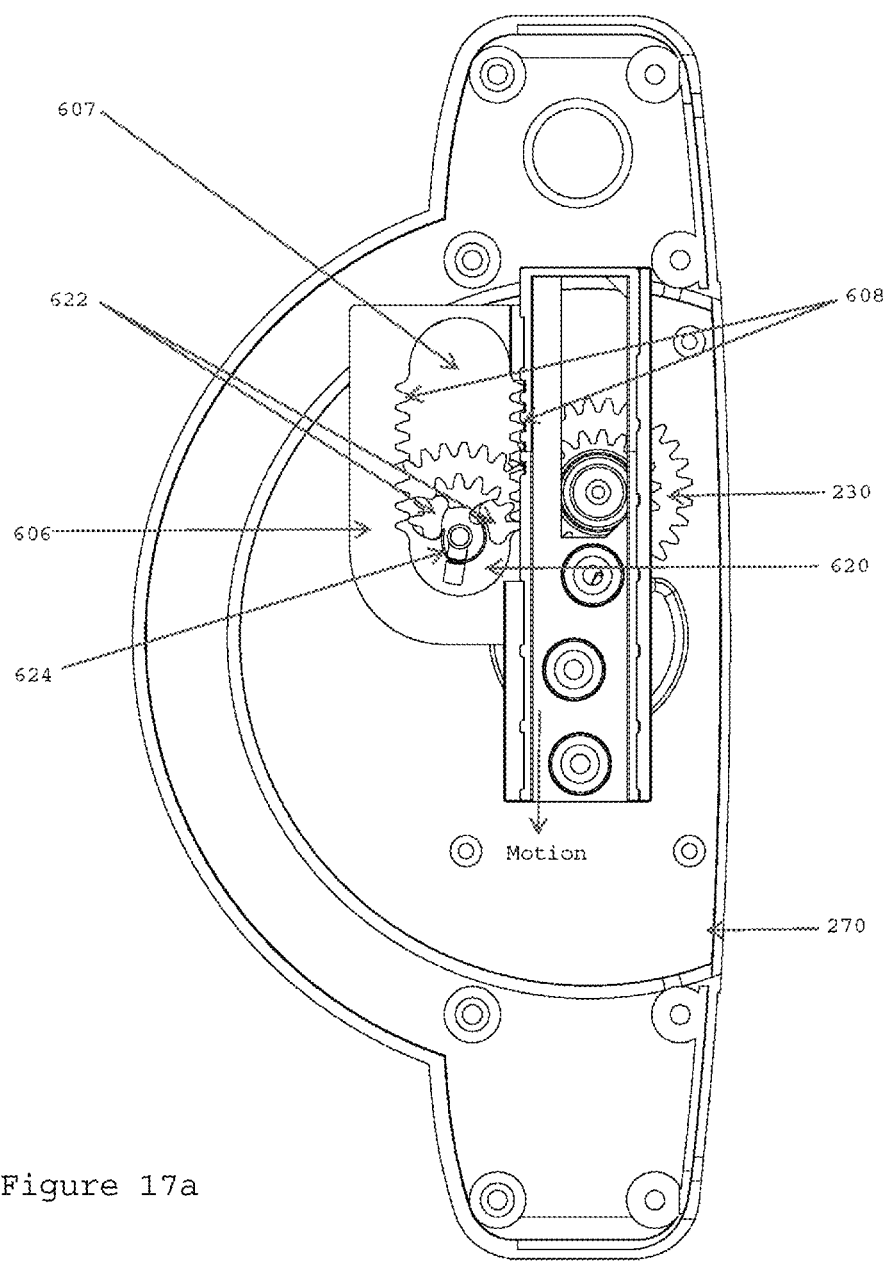
FIGS. 17a and 17b show the relationship between the slot assembly, drive gear, clutch gear, and output gear of the drive mechanism of FIGS. 14 and 15 when the slot assembly is moving out of the end point in FIG. 16.
Figure 17B:
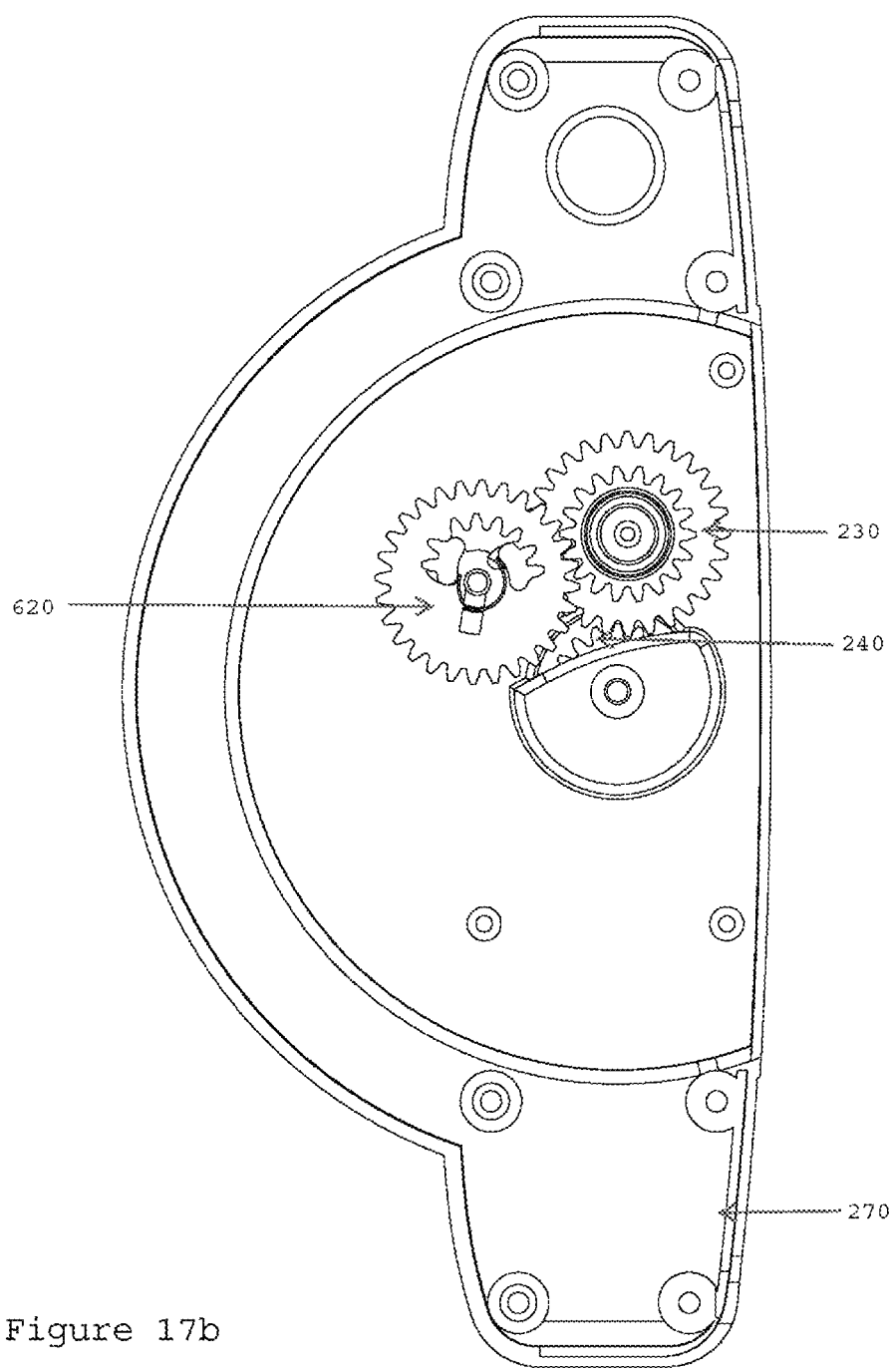
Figure 18:
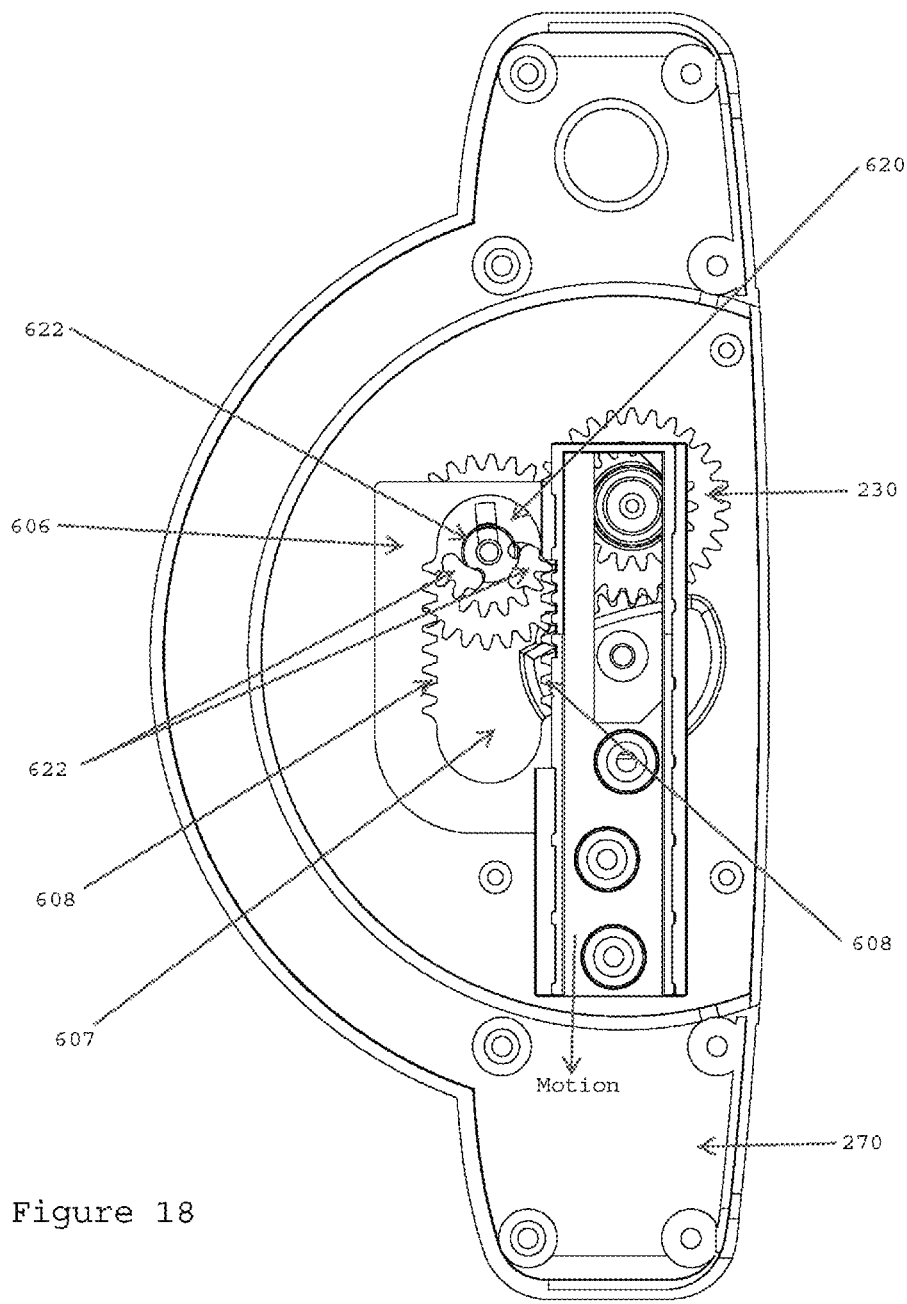
FIG. 18 shows the relationship between the slot assembly, drive gear, clutch gear, and output gear of the drive mechanism of FIGS. 14 and 15 when the slot assembly enters the other end point in FIG. 16.
Figure 19:
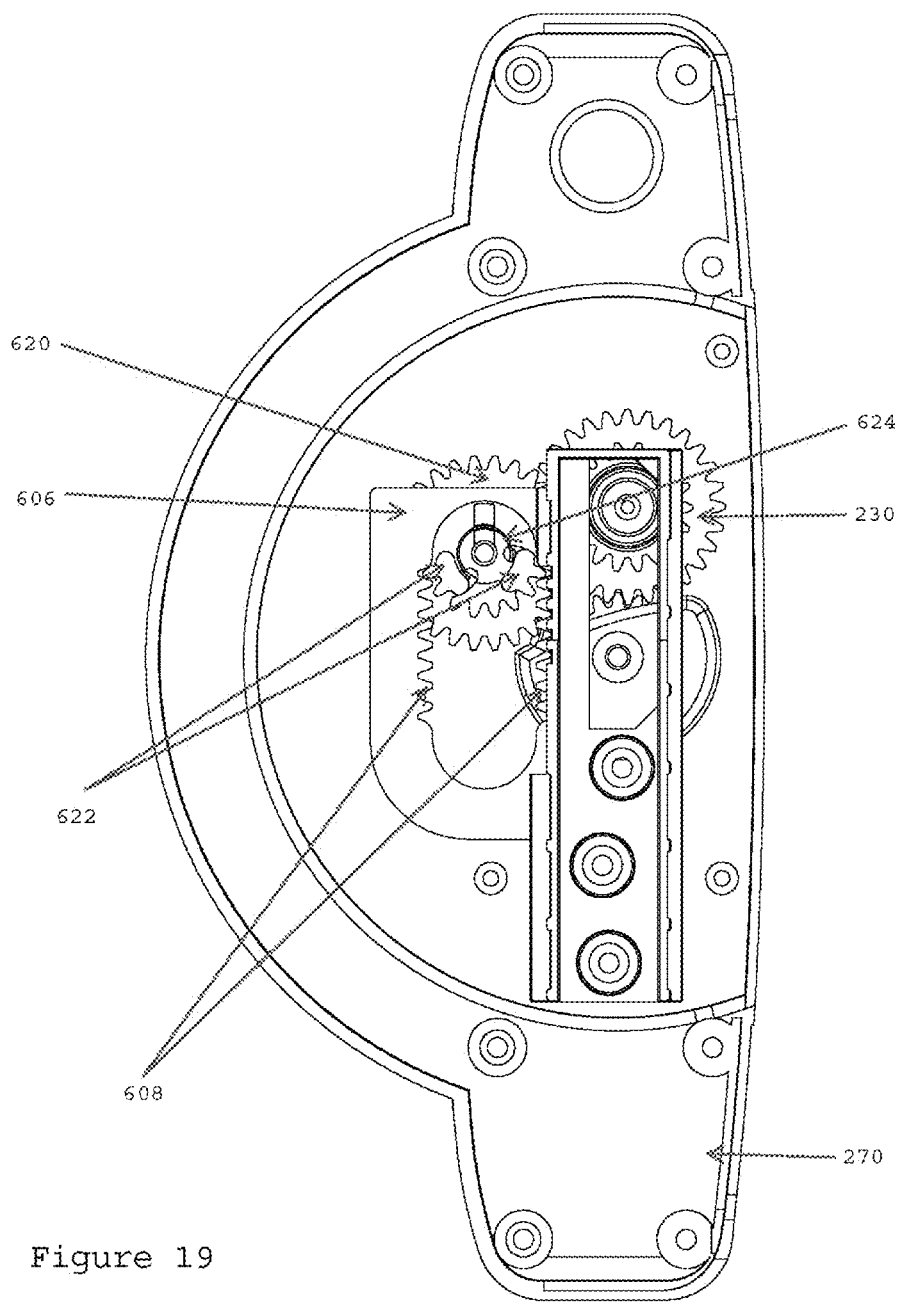
FIG. 19 shows the relationship between the slot assembly, drive gear, clutch gear, and output gear of the drive mechanism of FIGS. 14 and 15 when the slot assembly is moving out of the other end point in FIG. 16.

FIGS. 16 to 18 show how the arrangement in FIGS. 14 and 15 works, in which the relationship between the slot assembly 606, drive gear 620, clutch gear 230, and output gear 240 is shown. In FIGS. 16a and 16b, the slot assembly 206 is at one upper end point, which can be viewed as the initial position in the sequence in FIGS. 16 to 18. As shown in FIG. 16b, the clutch gear 230 and output gear 240 are disengaged. In FIGS. 17a and 17b, when the reciprocating handle 201 is actuated by a user, the slot assembly 606 is caused to be moved out of the end point in FIG. 16 in a downward direction, and the drive gear 620 is rotated clockwise accordingly. This causes the clutch gear 230 to move about the clutch gear swing slot 232 in a clockwise direction to engage the output gear 240, such that when the drive gear 220 is rotated, the output gear 240 is also rotated through the clutch gear 230. In FIG. 17a, the slot assembly 606 is about to leave the upper end point and is going to move downward, the flexible gears 622 "concede" or are moved when the ratchet teeth 608 presses against the flexible gears 622. The flexible gears 622 are arranged to pivot such that they always face the end of the slot 607 that they will be approaching. In FIG. 18, the slot assembly 606 is about to reach the lower end point, in which the flexible gears 622 again "concede" or are moved when the ratchet teeth 608 presses against the flexible gears 622. In FIG. 19, the slot assembly 606 reaches the lower end point when the direction of the motion along the linear path is about to be changed. The cycle in FIGS. 16 to 19 then repeats in a reversed direction.

As shown above, various arrangements of the current invention effectively convert force applied by a user in both directions of the reciprocating motion of the handle to rotation motion of the drying assembly, thereby enhancing the conversion efficiency and the performance of the food-drying device.

Further, salad spinners give little or no consideration to the design of the drying assembly. It was found that adding extra mass round the rim at the bottom of the drying assembly can enhance the stability of the operation. That is, the closed end of the drying assembly prefers to have at least one additional rim 302 to increase weight of the closed end to enhance performance of the salad spinners.

While the preferred embodiment of the present invention has been described in detail by the examples, it is apparent that modifications and adaptations of the present invention will occur to those skilled in the art. Furthermore, the embodiments of the present invention shall not be interpreted to be restricted by the examples or figures only. It is to be expressly understood, however, that such modifications and adaptations are within the scope of the present invention, as set forth in the following claims. For instance, features illustrated or described as part of one embodiment can be used on another embodiment to yield a still further embodiment. Thus, it is intended that the present invention cover such modifications and variations as come within the scope of the claims and their equivalents.

The invention claimed is:

1. A food-drying device including:
   a container;
   a drying assembly having a plurality of bores, said drying assembly disposed in the container and capable of being rotated relative to the container; and
   a drive mechanism for rotating the drying assembly relative to the container, said drive mechanism includes a reciprocating handle movable between a first position and a second position along a path, and a conversion mechanism for converting reciprocating movement of the reciprocating handle to rotary motion of the drying assembly from force supplied by a user to actuate the reciprocating handle moving from the first position to the second position, and from force supplied by the user to actuate the reciprocating handle moving from the second position to the first position
   characterized in that the conversion mechanism includes a slot assembly having ratchet teeth along two edges defining a slot, said slot assembly being coupled to the reciprocating handle, and said slot having a first end corresponding to the first position, and a second end corresponding to the second position,
   wherein the conversion mechanism includes
   an output gear being coupled to the drying assembly;
   a drive gear meshing with the ratchet teeth such that said slot assembly rotates the drive gear between the first end and the second end; and
   a clutch gear meshing with the drive gear, said clutch gear engaging the output gear when the drive gear is between the first end and the second end, and disengaging the output gear when the drive gear is at the first end or the second end wherein the ratchet teeth and the drive gear are arranged such that when the reciprocating handle changes direction of movement when the drive gear reaches the first end or the second end, the ratchet teeth can continue to rotate the drive gear.

2. The food-drying device of claim 1, wherein at least a portion of the ratchet teeth along the two edges is movable when the drive gear reaches the first end or the second end and is biased to engage the drive gear.

3. The food-drying device of claim 2, wherein said at least a portion of the ratchet teeth along the two edges is positioned at diagonally opposing ends of the two edges, and the ratchet teeth at other diagonally opposing ends of the two edges have reduced pitch.

4. The food-drying device of claim 2, wherein entire portion of the ratchet teeth along the two edges is movable and is biased to engage the drive gear as two movable racks, said movable racks having respective pivotal points being positioned diagonally opposing each other along the slot, and the ratchet teeth at other diagonally opposing ends of the two edges have reduced pitch.

5. The food-drying device of claim 1, wherein the drive gear have of flexible gears that mesh with the ratchet teeth, said flexible gears are movable when the drive gear reaches the first end or the second end and are biased to engage the ratchet teeth.

6. The food-drying device of claim 1, wherein the drying assembly has an open end opposing a closed end, and the closed end has at least one additional rim to increase weight of the closed end.

\* \* \* \* \*